United States Patent Office 3,040,245
Patented June 19, 1962

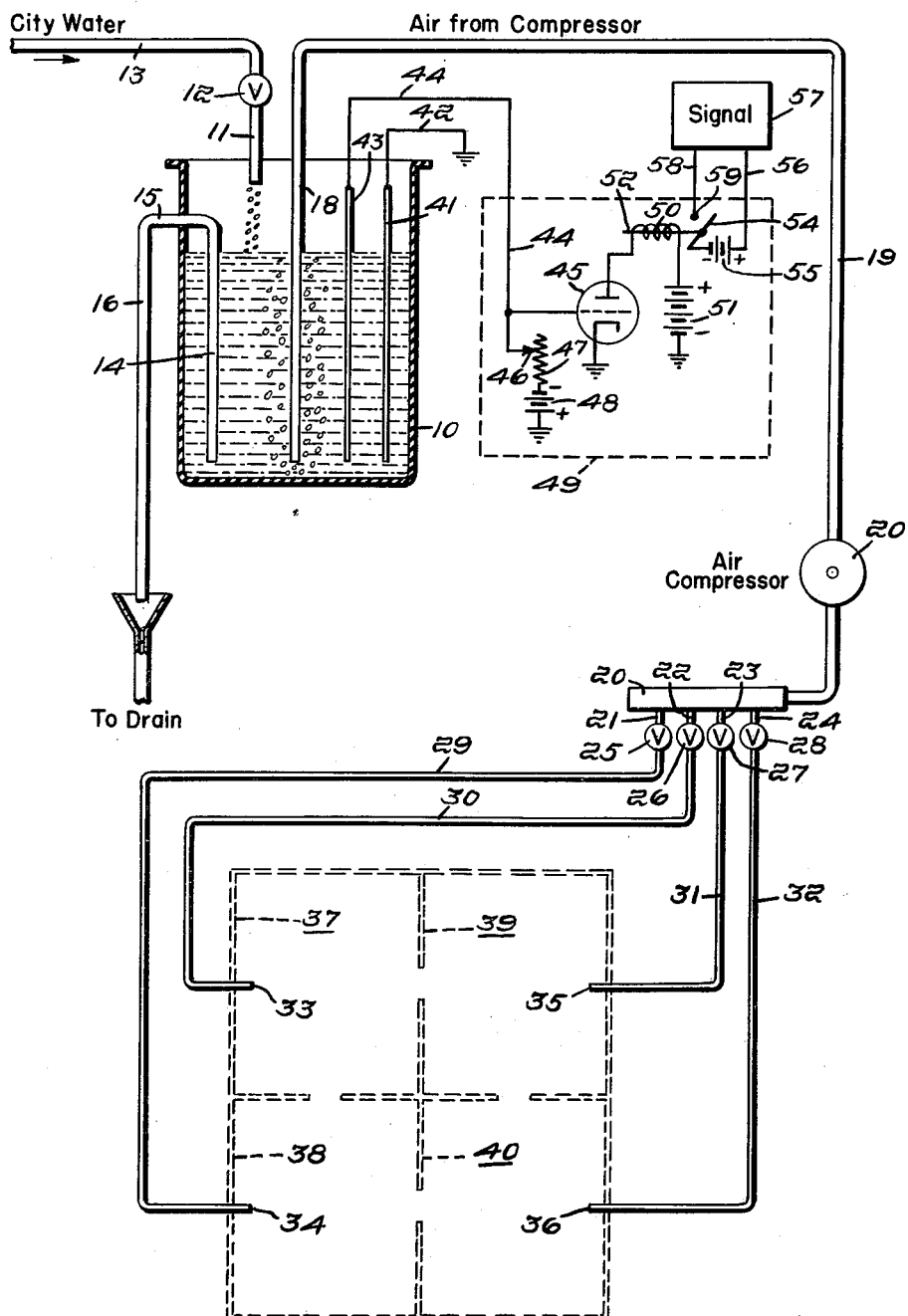

3,040,245
GAS DETECTORS
Robert T. Brizzolara, 68 Vincent Ave.,
Staten Island, N.Y.
Filed June 2, 1958, Ser. No. 739,366
5 Claims. (Cl. 324—30)

This invention relates to the detection of gases, and has as an object to detect toxic gases such as ammonia and sulphur dioxide that are readily absorbable by, and change the electrical conductivity of, ordinary tap water.

In buildings containing refrigeration plants using refrigerants such as ammonia or sulphur dioxide that are toxic, it is highly desirable to detect refrigerant leaks when they occur, not only for the safety of occupants of a building, but for the preservation of operation of the refrigeration equipment.

A feature of my invention is that I provide a gas detector using ordinary tap water. In one embodiment of my invention, tap water from an ordinary municipal supply source is flowed continuously at a predetermined rate into a flask into which air from one or more locations under observation is continuously pumped under the water level in the flask. The flask contains a syphon which quickly drains the flask when the syphon is covered by the water. Thus, the flask is filled and drained at predetermined times. In contact with the water in the flask are a probe electrode and a ground electrode which respond to an increase in the electrical conductivity of the water caused by absorption of gas, and which actuate a signal or a control when the gas supplied into the water causes a predetermined conductivity in the water. The supply of water into the flask is at such a rate that there is sufficient time for the gas supplied into the flask to increase the conductivity of the water in the flask a predetermined amount.

My invention will now be described with reference to the annexed drawing which is a circuit schematic of one embodiment of the invention.

A flask 10 of electric insulation has its water supply continuously renewed from a water pipe 11 connected through a valve 12 to a city water pipe 13. The flask has a syphon consisting of a tube having a vertically extending portion 14 within the flask 10, with its lower end adjacent but spaced from the bottom of the flask. The tube has a horizontally extending portion 15 extending through the side of the flask, connected at one end to the top of the tube portion 14, and connected at its other end to the top of a vertically extending tube portion 16 external the flask. The bottom of the tube portion 16 discharges into a suitable drain. When the top of the tube portion 14 is covered by water, the syphon is started and quickly drains the water in the flask until the bottom of the tube portion 14 is uncovered at which time the syphon stops and will not start again until the water supplied by the pipe 11 rises in the flask to again cover the top of the tube portion 14.

A vertically extending tube 18 has its lower end adjacent to but spaced from the bottom of the flask. The tube 18 is connected by tubing 19 to the outlet of an air compressor 20, the inlet of which is connected to a manifold 20. The manifold 20 has connected to it tubes 21, 22, 23 and 24 which are connected through valves 25, 26, 27 and 28 respectively and tubes 29, 30, 31 and 32 respectively, to breather tubes 33, 34, 35 and 36 respectively, the latter being located in rooms or zones 37, 38, 39 and 40 respectively.

The flask 10 contains, immersed within its water, a ground electrode 41 connected by a wire 42 to ground, and contains, immersed within its water, a probe electrode 43 connected by a wire 44 to a resistance measuring unit 49 which energizes a signal 57 when the resistance of the water in the flask decreases a predetermined amount. The unit 49 can be one of several commercially available, such, for example as Photoswitch Level Control, type 13DJ3, model No. 1002, manufactured by Photoswitch, Incorporated, Cambridge, Massachusetts. A simplified circuit of an operative control is shown within the rectangle 49, and includes a vacuum tube 45, having its control grid connected to the wire 44, and to slider 46 of variable resistor 47. The resistor 47 is connected to the negative terminal of C battery 48, the positive terminal of which is ground. The anode of the tube 45 is connected through relay 50 to the positive terminal of B battery 51, the negative terminal of which is grounded. The cathode of the tube 45 is grounded.

Plunger 52 of the relay winding 50 is mechanically connected to switch 54. The switch is electrically connected to one terminal of battery 55, the other terminal of which is connected to input wire 56 of the signal 57, the latter having another input wire 58 connected to relay contact 59.

The tube 45 is adjusted to or below cut-off by adjusting the position of the slider 46 along the resistor 47 to provide the necessary negative grid bias to keep the tube from conducting.

The gas to be detected by the breather tubes 33, 34, 35 and 36 is absorbed by the water in the flask 10 and decreases the resistance of the water. The resistance of the water between the electrodes 41 and 43 which may be in the form of screens or plates, is shunted across the grid-cathode circuit of the tube 45, which is shunted across the active portion of the resistor 47 and the series connected battery 48. A predetermined decrease in the resistance of the water causes the resistance between the grid of the tube and positive ground to decrease, bringing the grid nearer positive ground potential, making the grid more positive and raising the tube above cut-off, causing it to conduct.

When the tube 45 conducts ti energizes the relay winding causing the latter to pull in the plunger 52, causing the switch 54 to touch the contact 59 to energize the signal 57 to give an indication of the gas leakage.

The variable resistor 47 can be adjusted to adjust the sensitivity of the control to suit different gases to be detected, waters having different initial resistances, or other variables. Likewise the valve 12 can be adjusted to compensate for such different operating conditions.

The signal 57 can be a control for starting a ventilating fan, closing a door to isolate an occupied area from an affected area, or to turn off a refrigerant compressor.

The flowing of air into the water, also has the important advantage of agitating the water and thereby promoting the absorption of the gas by the water.

While a ground electrode 41, and a flask 10 of electric insulation are shown, the flask could be made conductive and serve as the ground electrode.

What I claim is:

1. A gas detector comprising a water container, means for continuously flowing water into said container, means for draining said container at the ends of predetermined intervals, means for supplying air that may contain a gas to be detected into the water in said container below the level of the water in said container, and means for detecting decreases in the resistance of the water in said container caused by an absorption of gas.

2. A gas detector as claimed in claim 1 in which said water draining means comprises a syphon.

3. A gas detector comprising a water container, means for continuously flowing water into said container, means for draining said container when the water within it has reached a predetermined level, means for supplying air that may contain a gas to be detected into the water in said container below the level of the water in said container, and means for detecting decreases in the resistance of the water in said container caused by an absorption of gas.

4. A gas detector as claimed in claim 3 in which said water draining means is a syphon.

5. A gas detector comprising a water container, means for continuously flowing water into said container, means for draining said container at the ends of predetermined intervals, means for supplying air that may contain a gas to be detected, into the water in said container below the level of the water in said container, a pair of of electrodes in contact with the water in said container, and resistance measuring means connected to said electrodes for measuring the resistance of the water therebetween.

References Cited in the file of this patent

UNITED STATES PATENTS

| | | |
|---|---|---|
| 2,102,282 | Roy | Dec. 14, 1937 |
| 2,156,693 | Jacobson et al. | May 2, 1939 |
| 2,270,768 | Polin et al. | Jan. 20, 1942 |
| 2,377,363 | Noble et al. | June 5, 1945 |
| 2,461,334 | Major | Feb. 8, 1949 |
| 2,525,754 | Albrecht | Oct. 17, 1950 |
| 2,697,191 | Wannamaker et al. | Dec. 14, 1954 |
| 2,733,201 | Thompson | Jan. 24, 1956 |
| 2,795,756 | Jacobson et al. | June 11, 1957 |
| 2,851,655 | Haddad | Sept. 9, 1958 |
| 2,943,028 | Thayer et al. | June 28, 1960 |

FOREIGN PATENTS

| | | |
|---|---|---|
| 355,131 | Italy | Dec. 20, 1937 |